(12) United States Patent
Lambert (10) Patent No.: US 6,193,153 B1
(45) Date of Patent: Feb. 27, 2001

(54) METHOD AND APPARATUS FOR NON-INTRUSIVE BIOMETRIC CAPTURE

(76) Inventor: Francis Lambert, 1675 S. Birch #1201, Denver, CO (US) 80222

( * ) Notice: Subject to any disclaimer, the term of this patent is extended or adjusted under 35 U.S.C. 154(b) by 0 days.

(21) Appl. No.: 09/059,733

(22) Filed: Apr. 13, 1998

Related U.S. Application Data (60) Provisional application No. 60/042,001, filed on Apr. 16, 1997.

(51) Int. Cl.[7] .................................................. G06K 5/00
(52) U.S. Cl. ................................... 235/380; 235/382
(58) Field of Search .............................. 235/375, 376, 235/379, 380, 381, 382, 38.5, 383, 384, 385, 386; 902/26, 3; 382/123–127, 115–118; 345/163, 156, 168; 340/825.3–825.35

(56) References Cited

U.S. PATENT DOCUMENTS 5,208,582 * 5/1993 Hwang .
5,581,630 * 12/1996 Bonneau, Jr. .
5,615,277 * 3/1997 Hoffman .
5,838,306 * 11/1998 O'Connor et al. .

* cited by examiner

*Primary Examiner*—Thien M. Le
(74) *Attorney, Agent, or Firm*—Townsend and Townsend and Crew LLP (57) ABSTRACT

A computer peripheral device for providing a computer system with user input data and user biometric data includes an event sensing portion for detecting a user action and for converting the user input into a data first stream, the user action of a type appropriate for the computer peripheral device, a biometric acquisition portion for acquiring biometric data from the user at substantially a same time the event sensing portion detects the user action, and for converting the biometric data into a second data stream, and a processor coupled to the event sensing portion and the biometric acquisition portion for reversibly encoding the first data stream and the second data stream to form a third data stream, and for providing the third data stream to a computer system or a network.

24 Claims, 6 Drawing Sheets

METHOD AND APPARATUS FOR NON-INTRUSIVE BIOMETRIC CAPTURE

CROSS REFERENCE TO RELATED APPLICATIONS

This application claims priority from the provisional patent application entitled HAND SCANNING POINTING DEVICE, filed Apr. 16, 1997 and assigned application No. 60/042,001, the disclosure of which is hereby incorporated in its entirety for all purposes.

BACKGROUND OF THE INVENTION

The present invention generally relates to methods and apparatus for capturing of biometric data. More particularly, the present invention relates to capturing of biometric data using methods and apparatus that are less intrusive or more transparent to the user and can occur with reduced user initiation or knowledge.

For many centuries, the question "Hark, who goes there?" challenged those who approached the castle gates. Was the person a friend or a foe or a subject or a spy? Did they know the secret password or did their messages carry the Emperor's seal? In modern times, the need for security and authentication of transactions are still of great concern and have spawned multi-billion dollar industries. For example, automatic teller machines (ATMs) transactions, credit-card charges, "smart cards" usage, home and industrial security systems monitoring, computer data and applications protection, and the like all require high levels of security.

With the wide-spread use of computers and the Internet, the security of data stored within computers is of increasing concern. Many methods have been devised to restrict the access of computer data or applications to authorized users, such as installing computer firewalls, implementing complex password schemes, using call-back numbers, providing challenge and response hardware, and the like. As illustrated regularly in the popular press, for each such protection mechanism, hackers have found many ways to circumvent them.

A further concern with the wide-spread use of computers and the Internet is the authentication of electronic communications or files. As an example, application files and patches are often available from multiple places on the Internet. Thus, in order to verify that the source of the file is the manufacturer of the software, as opposed to a Trojan horse, or other destructive virus, files are now often encrypted with special keys that uniquely identify the manufacturer of the file. Such schemes have not been widely implemented or uniformly used.

In order to provide a higher level of protection than described above, in addition to password-type schemes above, one technique has been to combine the password-type schemes with biometric user-identifying capturing devices. Biometric Capture is a term used that generally refers to the sensing and conveyance of physical attributes of a user including finger prints, palm prints, voice prints, retinal patterns, facial orientations, body temperature, and the like.

One drawback to present biometric capturing devices is that present devices are not transparent to the user and are inefficient, i.e. they require the user to stop and perform a physical act specifically for the biometric device. Such artificial acts include facing a camera, placing a forehead against a pad so that a retinal image can be captured, placing a hand on a peg board or a finger on a particular surface for a certain amount of time, speaking keywords or phrases, and the like.

Another drawback to present biometric capture devices include that they are typically stand-alone devices having virtually no function other than capturing the biometric data. Because such devices are stand-alone, they are typically only used as gate keeper devices. As a result, when the biometric security device has been satisfied, fulfilled, or bypassed, there is open access to the secure data, the secure area, and the like. For example, once a user has been authorized to enter a security door, the door may be left open for unauthorized users to enter, similarly, when a screen saver password has been entered correctly, the files on the computer may be accessed.

Thus, what is needed are methods and apparatus for capturing of biometric data that are less intrusive or more transparent to the user and provide a higher level of security. Further, what is needed are method and apparatus for more continuous monitoring of biometric data of users of restricted or secure areas for verification purposes.

SUMMARY OF THE INVENTION

According to the present invention, a technique including methods and devices for simultaneously receiving user input on a computer peripheral and biometric data from the user on the same device is disclosed. The biometric data is typically used to determine the identity of the user.

An advantage of such a device is that a computer to which it is attached runs a program that analyses the signals provided by the device to determine the identity of the user operating it and in response, the program may restrict the use of the computer or restrict the access to information on a network, and the like. Alternatively, based upon the user identity, the program may interpret the signals in a way specific to the specific user, for example directory access, environmental preferences, e-mail access, and the like.

Another advantage of this input device is that the determination of the identity of the user of the device is non-intrusive since the user has to interact physically with the input device for normal operation of the device, for example, a keyboard, a mouse, a camera, or a microphone. The input device's function requires little unusual action and lessens user interruption.

Another advantage of the device is that the identity of the operator can be scanned throughout the computing session without interrupting the actions of the operator. This prevents digital simulation of, for example, hand measurement aspects in a one-time "start-of-session" security check since the computer can check the operator identity at random intervals throughout the session. Further, the computer can diagnose the authenticity of the biometric measurement device by verifying that the same device is also controlling the cursor movement. Still further, if the operator leaves the computer unattended, the device can determine if a different person begins to use the computer when they interact with the biometric capture peripheral device.

In one embodiment, the device scans attributes of a user's hand while the user moves a pointing device. The device communicates with a computer over a standard mouse port, keyboard port, or other methods such as the universal serial bus (USB), used in personal computer systems. Such ports are used to communicate the motion of the pointing device to the computer. With this invention, these same data channels can contain information about the physical aspects of the hand of the user operating it. This information includes, but is not limited to fingerprints, thumbprints, palm prints, hand geometry, temperature, pulse, chemical composition, geometric composition, grip strength of the operator's hand, and the like. This biometric information can be used alone or in combination with other factors to more transparently determine the identity of the user.

As is commonly done with pointing devices, the "mouse" port, keyboard port, or USB can supply power to the intrusive biometric identifying peripheral device. The computer system boot program can be configured to prevent the use of a pointing device, or other device, if user's hand is not scanned, regardless of the identity of the user. This determination could be part of the normal start-up diagnostics of the computer pointing device driver. As an enhancement, the boot program can be configured to disallow "non-scanning" pointing devices from being used with the computer. Additionally, other functions of the computer such as the video display, disk storage subsystems, keyboard drivers, and the like could also be disallowed.

The biometric data derived from the user's hand is transmitted into the computer, and the biometric data is analyzed. The computer compares the biometric data to an on-line reference database of known biometric data to determine the identity of the user. Based upon the identity, a user specific configuration of the computer can be performed, such as unlocking certain files, allowing access to certain areas, and the like. When an unrecognized user is detected components of the computer such as the video display, disk storage subsystems, network interface, keyboard, and the like could also be disabled.

The computer can record the biometric aspects of the unauthorized operator's hand for later identification of that user for evidentiary purposes. The device can also be used to record and prove legitimate use of computing or other devices at a specific times, such as employee time cards, financial transactions, remote voting, sender/receiver verification in electronic communication, client billing, and the like.

Since the mechanism and electronics required to produce a functional pointing device have become small and reliable, the hand scanning mechanism and electronics could fit into an input device that would still look and feel identical to current "ordinary" input devices. This allows the users to feel comfortable with using the input device since it is already familiar to them.

According to one embodiment of the present invention, a computer peripheral device for providing a computer system with user input data and user biometric data, includes a peripheral activity event sensing portion for detecting use of the device for user input actions and for converting the user input into a data first stream, the user action of a type appropriate for the computer peripheral device, and a biometric acquisition portion for acquiring biometric data from the user at substantially the same time the event sensing portion detects the user action, and for converting the biometric data into a second data stream. The peripheral device also includes a processor coupled to the event sensing portion and the biometric acquisition portion for reversibly encoding the first data stream and the second data stream to form a third data stream, and for providing the third data stream to the computer system.

According to another embodiment of the present invention a method is disclosed for providing a computer system with user input data and user biometric data. The method includes the steps of providing a computer peripheral device, the computer peripheral device including an event sensor and a biometric sensor, detecting a user induced event with the event sensor, and detecting user biometric data at substantially the same time as the step of detecting the user input event. The steps of converting the user input event into a first set of electronic signals, and converting the user biometric data into a second set of electronic signals, is also disclosed. Transmitting the first set of electronic signals to the computer system, and transmitting the second set of electronic signals to the computer system are also performed.

Further understanding of the nature and advantages of the invention may be realized by reference to the remaining portions of the specification and drawings.

DESCRIPTION OF SPECIFIC EMBODIMENTS

System Overview

Figure 1:
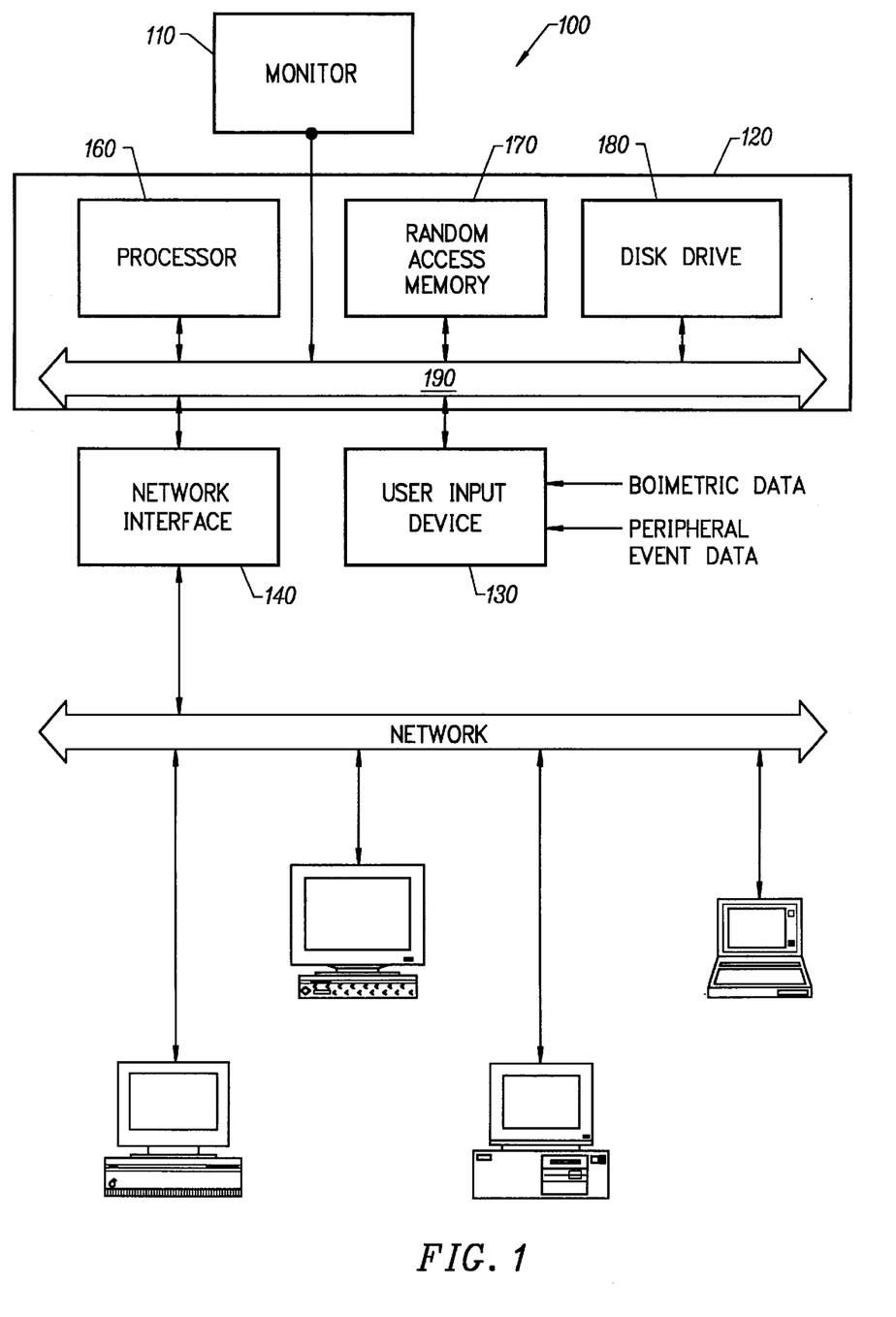
FIG. 1 is a simplified block diagram of a system according to an embodiment of the present invention.

FIG. 1 is a simplified block diagram of a system 100, according to an embodiment of the present invention. This diagram is merely an illustration and should not limit the scope of the claims herein. The system 100 includes a monitor 110, a computing system 120, a novel user input device 130, and a network interface 140. Computing system 120 preferably includes familiar components such as a processor 160, and memory storage devices, such as a random access memory (RAM) 170, a fixed disk drive 180, and a system bus 190 interconnecting the above components.

Novel user input device 130 may include a mouse, a trackball, a keyboard, a keypad, a joystick, a digitizing tablet, a wireless controller, a microphone, a camera, or other input devices, or any other user input device describe herein, and the like.

RAM 170 and fixed disk drive 180 are mere examples of tangible media for storage of computer programs, audio and/or video data, and code implementing embodiments of the present invention. Other types of tangible media include SRAM, floppy disks, optical storage media such as CD-ROMs and bar codes, semiconductor memories such as flash memories, read-only-memories (ROMs), ASICs, battery-backed volatile memories, and the like.

In a preferred embodiment, computing system 120 includes a '586 class microprocessor running Windows95™ operating system from Microsoft Corporation of Redmond, Wash. Of course, many other operating systems such as MacOS™ from Apple Corporation, of Cupertino, Calif. and the like can also be used depending upon the application.

The system above is merely one example of a configuration that embodies the present invention. It will be readily apparent to one of ordinary skill in the art that many system types, configurations, and combinations of the above devices are suitable for use in light of the present disclosure. Of course, the types of system elements used depend highly upon the application.

Detailed Device Description

Figure 2A:
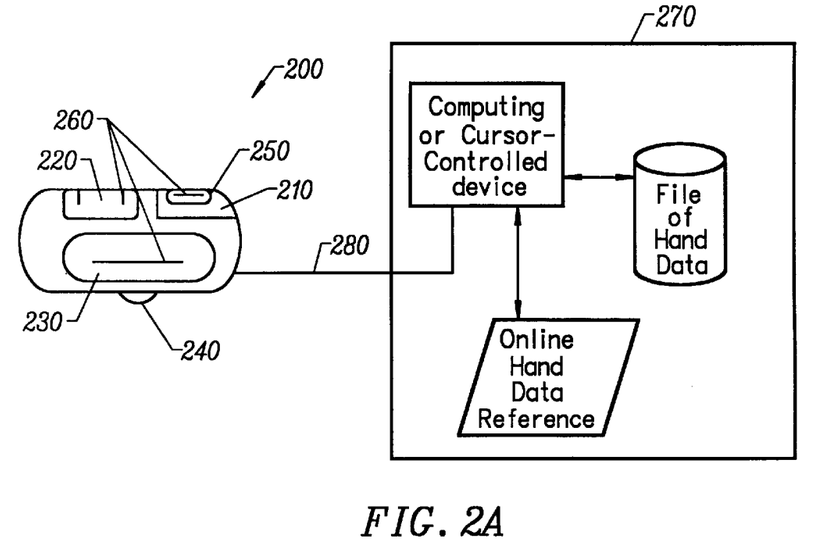
FIGS. 2a and 2b illustrate an embodiment of the present invention.
Figure 2B:
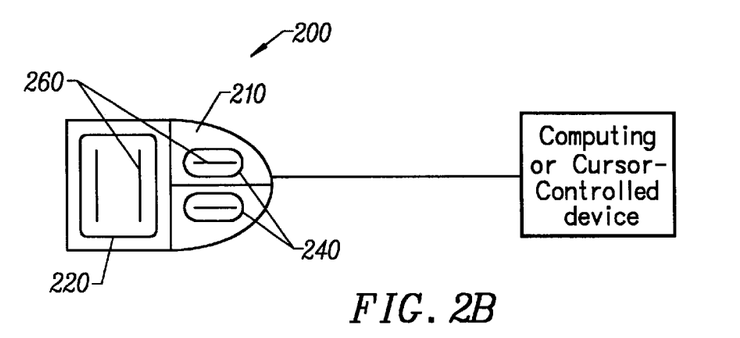

FIGS. 2a and 2b illustrate an embodiment of the present invention. FIGS. 2a and 2b include a standard pointing device 200, having selection buttons 210, biometric scanning regions 220–230, and a motion sensor 240. Selection buttons 210 include biometric scanning regions 250.

In the present embodiment, pointing device 200 is embodied as a standard computer mouse having two selection buttons 210. In alternative embodiments of the present invention, computer mice may include any number of selection buttons, however typically more than one button. Further, embodiments of the present invention may include thumb-wheels, or other types of "window" scrolling devices, such as a rocker switch.

As is well known with computer mice, as the user moves the shell of the mouse, motion sensor 240 captures the relative movement of the shell of the mouse to a stationary surface. In the present example, motion sensor 240 includes a mouse ball coupled to electromechanical optical sensors. When the shell of the mouse moves in a particular direction, the mouse ball rotates in the opposite direction, and the mouse ball rotation is captured as a series of pulses by the electromechanical optical sensors. The operation of such computer mice are well known.

In another embodiment, the mouse is used in conjunction with a semi-reflective grid-pattern tablet, and motion sensor 240 includes light emitters and receivers. When the shell of the mouse is moved relative to the tablet, the light receivers detect crossings of the grid-pattern of the tablet as a series of pulses. This series of pulses are used to determine the motion of the mouse.

In another mouse embodiment, pointing device 200 is embodied as a "puck". In such an embodiment, the puck is used in conjunction with an electrically-powered tablet, and motion sensor 240 typically includes a positional sensor. When the shell of the puck is moved over the tablet, the positional sensor, typically a coil of wire, detects the position of the puck, based upon transmissions from the electrically powered tablet.

In yet another embodiments, pointing device 200 comprises a trackball arrangement, where the user directly rotates a track-ball. In response to the movement of the track-ball, a series of electromechanical optical sensors captures the rotation as a series of pulses. Typical electromechanical optical sensors comprise mechanical rollers coupled to rolling shutters disposed between light sources and receivers as is well known. Alternatively, track-balls may comprise semi-reflective patterns, that reflect light between static light sources and receivers. Other types of translation from mechanical rotation to electrical pulses are contemplated in alternative embodiments.

Other embodiments of the present invention also include other input devices such as track pads, "eraser"-type pointers commonly found in notebook computers, light-pens, screen-based navigation often found on interactive kiosks, eye motion sensors, keypads, keyboards, microphones, and the like.

The example in FIGS. 2a and 2b illustrate biometric scanning regions 220–230 and 250. Biometric scanning regions 220–230 and 250 are used to facilitate capture biometric data from a user; in this particular example, biometric data is acquired from the user's hand. Many biometric scanning technologies can be used that will be familiar to those skilled in the art of biometric measurement of the hand.

Conventional biometric scanning devices include, for example, the use of light waves for imaging as described in U.S. Pat. No. 5,467,403, the use of ultrasonic patterns as described in U.S. Pat. No. 5,454,045, and the like. These patents are herein by incorporated by reference for all purposes. Any conventional biometric data acquisition methods and apparatus envisioned may be used in conjunction with embodiments of the present invention.

In the present embodiment, biometric scanning region 220 is used to capture a portion of a palm print of the user; biometric scanning region 230 is used to capture a thumb print for a left-handed user or a ring-finger of a right-handed user; and biometric scanning regions 250 are used to capture fingerprints of the index and middle finger. In the present embodiment, it is contemplated that scanning region 230 is disposed on both sides of pointing device 200.

Other types of biometric scanning can be performed at the same biometric scanning regions in alternative embodiments of the present invention. In FIGS. 2a and 2b, for example, biometric scanning region 260 illustrates the locations of other possible biometric sensors, for measuring capacitance, the chemical composition of vapors and aromas exuding from the skin of the hand, grip strength, hand geometry, perspiration, body temperature, and the like. The different biometric scanning techniques may be performed simultaneously, individually at regular time intervals, or in combinations at particular times, and the like. Other combinations of scanning and time intervals are envisioned in other embodiments of the present invention.

In one embodiment, only one biometric scanning region, for example, only scanning region 230, is provided, thus only one biometric measurement is performed at any one time.

In the present embodiment, the physical movement of the device and the biometric data are combined and transmitted to computing system 270 via signal line 280. In other embodiments, the device may be a "cordless" or "wireless" device, thus any conventional method for communicating with computing system 270 are contemplated. For example, the device may rely upon infrared, RF, ultrasonic transmissions, and the like. Computing system 270 may be any computer system 120 described in FIG. 1, above, or others.

In one embodiment of the present invention, signal line 280 is coupled to a standard computer PS/2 mouse port to provide data to computing system 270. In alternative embodiments of the present invention, signal line 280 is coupled to a standard serial COM port, to the universal serial bus (USB), to a joy-stick port, a parallel port (ECP, EPP, etc.), or the like. The interface may be direct or via intermediary devices, such as a USB hub or a switching mechanism.

Figure 3:
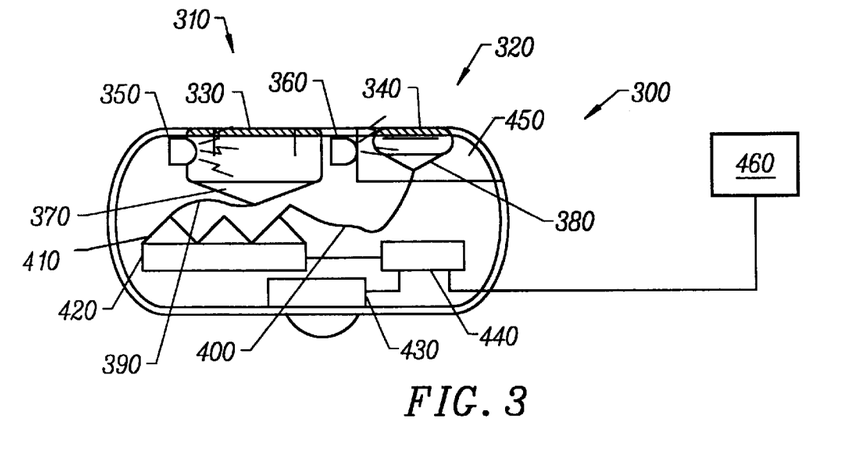
FIG. 3 illustrates a cross-section view of an embodiment of the present invention.

FIG. 3 illustrates a cross-section view of an embodiment of the present invention. FIG. 3 includes a device 300 including biometric sensors 310 and 320. Biometric sensors 310, 320 include translucent panels 330, 340, illumination sources 350, 360, optical focusing elements 370, 380, and image conduit elements 390, 400, respectively. Device 300 also includes optical diffuser elements 410, an optical sensor 420, motion sensor 430, and a processor 440. Biometric sensor 340 is illustrated disposed upon selection button 450.

In the present embodiment, translucent panels 330 and 340 provide a surface through which a portion of a palm print and a finger print are respectively acquired. In one embodiment, translucent panels 330 and 340 comprise a plastic such as Lexan™, Plexglass™, and the like, although other types of plastics can also be used. In one embodiment, translucent panels 330 and 340 are clear, although in alternative embodiments, translucent panels 330 and 340 may be tinted for aesthetic purposes. Alternatively, translucent panels 330 and 340 comprise clear or tinted glass panels.

Translucent panels 330 and 340 are typically illuminated by light sources 350 and 360, respectively. In one embodiment, light sources 350 and 360 comprise light emitting diodes (LEDs). Typical LEDs used in the present embodiment output red-colored light. In alternative embodiments of the present invention, the LEDs may output other colors of light such as white, blue, yellow, green, infra-red and the like. LEDs are selected within this embodiment because of the low-power requirements of diodes, however in alternative embodiments, other sources of illumination such as incandescent lighting, florescent lighting, optical fiber terminators with a single light source, and the like are also contemplated.

Light sources 350 and 360 typically have sufficient intensity to illuminate the hand of a user above translucent panels 330 and 340. In one embodiment of the present invention, users do not necessarily place their hands directly upon translucent panels 330 or 340 before moving device 300. Thus, in such an embodiment, light sources 350 and 360 should have enough intensity to illuminate a hand placed within approximately one-half of an inch above translucent panels 330 and 340. In alternative embodiments the distance may vary, for example, from two inches away to touching translucent panels 330 and/or 340. To lessen the power requirements of device 300, the illumination distance should be shorter.

In the present embodiment, light reflecting from of the user's hand passes back through translucent panels 330 and 340 and encounters optical focusing elements 370 and 380. Optical focusing elements 370 and 380 receive the reflected light and respectively focuses the reflected light into image conduit elements 390 and 400 and direct the light to optical diffuser elements 410. Any conventional optical focusing elements 370 and 380 and optical diffuser elements 410 can be used in embodiments of the present invention. Typical image conduit elements UITPE are bundled multi mode fiber optic cable with a typical diameter of 0.2 mm, or like diameters to provide sufficient imaging resolution to allow sufficient biometric information for user identity determination.

In the present embodiment, the expanded light from diffuser elements 410 are imposed upon optical sensor 420. In the present embodiment, optical sensor 420 is typically sensitive to the light produced by light sources 350 and 360. In turn, optical sensor typically converts the light signals into electronic or digital signals. In this embodiment, optical sensor 420 is a CCD array, or other optical sensor presently developed or developed in the future, and the like. Typically, optical sensor 420 outputs a stream of biometric data representing an image of a portion of the user's palm and fingerprint to processor 440.

In alternative embodiments of the present invention, optical focusing elements 370 and 380, image conduit elements 390 and 400, and optical diffuser elements 410 are not required. In such embodiments, the light reflected from the user's hand is directly imaged, or via simple focusing elements imaged, onto multiple optical sensors 420. Such an embodiment is preferred when the number of biometric scanning regions is small due to cost of providing redundant optical sensors 420. As disclosed above, each optical sensor 420 would output a stream of biometric data to processor 440.

In the present embodiment, sensor 430 outputs a stream of movement or input data, according to the user's physical movement of device 300. As described in the various embodiments in conjunction with FIGS. 2a and 2b, the input data is typically a stream of data representing absolute positional signals, changes in positional signals, and the like. These input data are output to processor 440.

In the present embodiment, processor 440 (scan processing circuitry) receives streams of data representing both the input data and the biometric data. Processor 440 typically also receives instructions from a computing system 460. In the present embodiment, in one mode of operation, processor 440 outputs input data to computing system 460. As will be discussed below, in another mode of operation, processor 440 combines or encodes the input data and the biometric data, in response to instructions from computing system 460, and outputs the encoded data to computing system 460. In alternative embodiments, the input data and the biometric data may be interleaved, may be transmitted in packets of predetermined sizes, and structure, and the like.

In the present embodiment, processor 440 also controls light sources 350 and 360. When output of biometric data is required, processor 440 typically turns on light sources 350 and 360, and when output of only input data is required, processor 440 typically turns off light sources 350 and 360. Alternatively, light sources 350 and 360 may be continuously illuminated so as to not alert the user to the capture of biometric measurements.

An advantage to illuminating light sources 350 and 360, for example, when biometric data is required, is that the device provides a visual indication to the user that they should place their hand on the device. In other embodiments, incorporating other types of biometric sensors such as grip pressure, odor, etc. an indication means such as a light or a buzzer may be included to device 300 that provides the user with a visual or aural indication that a biometric acquisition is required.

In the present embodiment, processor 440 is typically embodied as a 'C84 chip from Microchip company. In alternative embodiments, processor 440 can be embodied as the 8051 chip from Intel, the 6805 chip from Motorola, as a microcontroller, as an ASIC, or the like.

As will be described below, computing system 460 receives the encoded signals from device 300, decodes the encoded signals, and processes the input data and the biometric data For example, computing system 460 may determine the identification of the user based upon the biometric data and in response thereto perform an action appropriate for the user.

Figure 4:
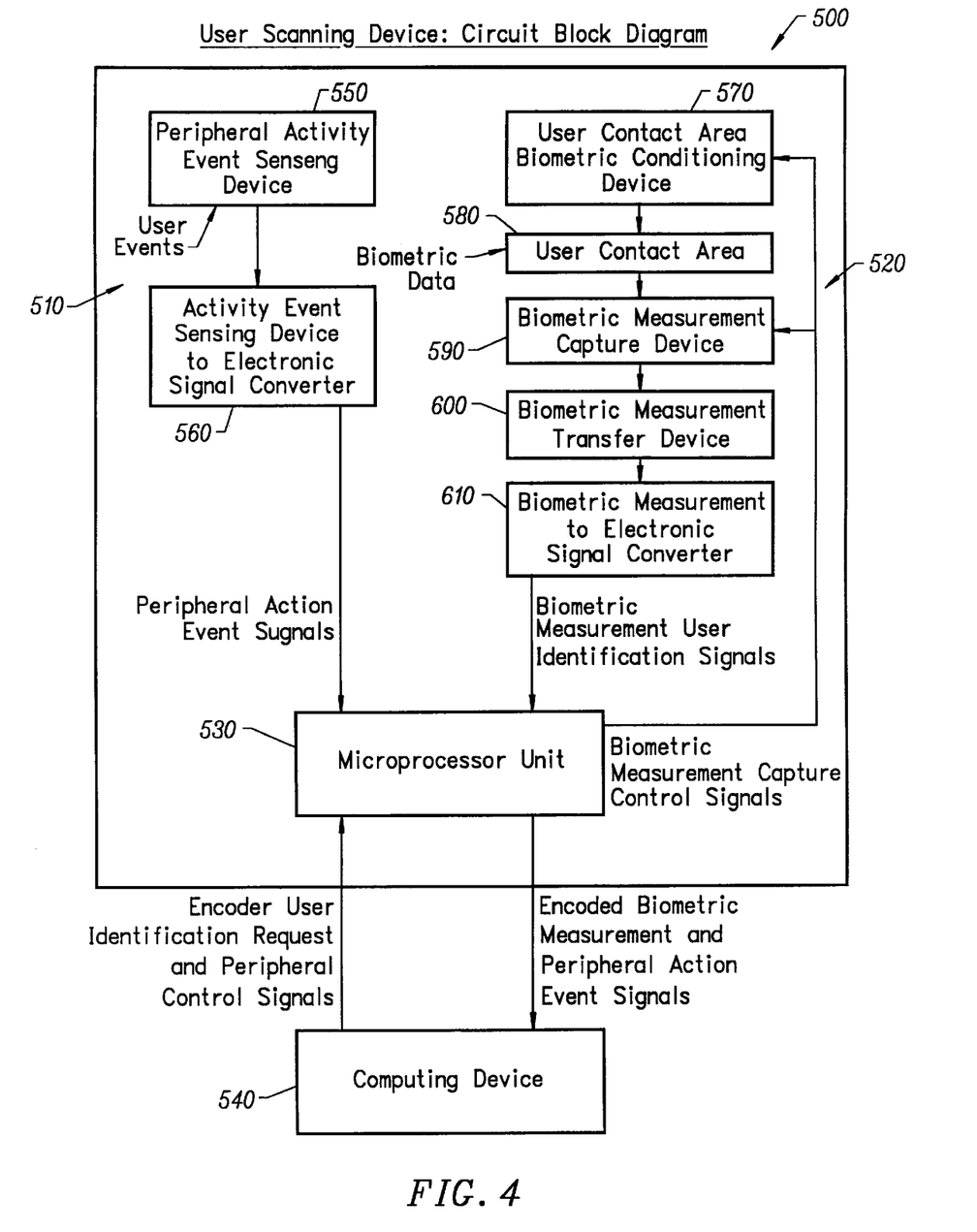
FIG. 4 illustrates a block diagram of an embodiment of the present invention.

FIG. 4 illustrates a block diagram of an embodiment of the present invention. In FIG. 4, a User Identifying Computer Peripheral Device (user input device) 500 includes a Peripheral Activity Event subsystem (event sensing portion) 510, a User Identifying subsystem (biometric acquisition portion) 520, and a Microprocessor Unit (a processor portion) 530. User input device 500 is typically a peripheral input device of a Computing Device (computing unit) 540.

Event sensing portion 510 includes a Peripheral Activity Event Sensing Device (event sensor) 550 and a Peripheral Activity Event Sensing Device to Electronic Signal Converter (event converter) 560. Event sensing portion 510 provides Peripheral Activity Event Signals (event data) to processor portion 530.

Biometric acquisition portion 520 includes a user contact area Biometric Conditioning Device (conditioning device) 570, User Contact Area(s) 580, a Biometric Measurement Capture Device (biometric capture device) 590, a Biometric Measurement Transfer Device (transfer device) 600, and a Biometric Measurement to Electronic Signal Converter (biometric converter) 610. Biometric acquisition portion 520 provides Biometric Measurement User Identification Signals (biometric data) to processor portion 530 in response to Biometric Measurement Capture/Control Signals (control signals).

Processor portion 530 receives "Encoded User Identification Request and Peripheral Control Signals" (input data) from computing unit 540 and outputs "Encoded Biometric Measurement and Peripheral Action Event Signals" (output data).

The present embodiment allows the computing unit 540 (or an entity on a network to which user input device 500 is attached), to non-intrusively identify the user of user input device 500 at random or pre-determined intervals during the usage session of computing unit 540. As will be described below, this functionality is useful for restricting access of computing unit 540 to authorized network resources, perceiving a change in the user identity during the session of computing unit 540 usage, authenticating the identity of the user during communication, commerce, or voting applications, and the like.

In the present embodiment, event sensor 550 detects user events, such as physical interaction with the input subsystem. As discussed above, this physical interaction includes pushing of buttons, touching of a keypad, movement of user input device 500, movement of a portion of user input device 500 such as a track ball, speaking into a microphone, facing a camera, directing the eyes towards a return scanning eye movement cursor control, and the like.

In response to the event of physical interaction with the event converter 560 preferably converts the interaction into a stream of electrical data pulses, the event data. For example, touching of a key on a keyboard is translated into a pre-defined series of pulses, movement of a joystick or a mouse is translated into a series of pulses, and the like.

In the present embodiment, processor portion 530 receives "Encoded User Identification Request and Peripheral Control Signals" (input data) from computing unit 540. In this embodiment, unit 540 instructs and controls user input device 500 to be in one of three states, peripheral event data, biometric data, or combined event data/biometric data. As discussed above, in biometric input state, user input device 500 provides both the user biometric data and the peripheral event (input) data to computing unit 540; in the conventional input state, user input device 500 only provides the peripheral event data to computing unit 540.

More than two states can be provided and specified by computing unit 540, in other embodiments, for example, one state could be a purely biometric input state where only the biometric data is provided to unit 540. In other examples, other states could may include encrypted and non-encrypted state for the biometric input data for transmission over public networks, or it may include combinations of the data for predetermined intervals, and the like.

In this example, when acquisition of biometric data is requested, processor portion 530 transmits "Biometric Measurement Capture Control Signals" (control signals) to conditioning device 570 and to biometric capture device 590. In response, conditioning device 570 prepares user contact area 580 for biometric measurement. In the present example, conditioning device 570 is embodied as light emitting diodes (LEDs), as previously discussed, that are turned on to illuminate user contact area 580.

In the embodiment above, user contact area 580 is embodied as a translucent panel through which portions of the user's hand is visible. Light from conditioning device 570 typically reflects from portions of the user's hand, and the image is sensed by biometric capture device 590. In the embodiment described above, biometric capture device 590 comprises optical focusing elements.

Capture device 590 subsequently transfers images of portions of the user's hand via transfer device 600, and onto biometric converter 610. In the present embodiment, transfer device 600 includes image conduit elements of bundled multi-mode optical fibers coupled to optical diffusing elements. Further, biometric converter 610 is embodied as an optical to electrical conversion device, for example a CCD array.

Biometric converter 610 receives images of portions of the user's hand, converts them into a stream of electrical data pluses, the biometric data and outputs the biometric data to processor portion 530.

Many configurations and combinations of functional blocks within biometric acquisition portion 520 are contemplated in alternative embodiments of the present invention. For example, in one embodiment, transfer device 600 is not needed if only one set of biometric measurements are required at one time. Further, in one embodiment, conditioning device 570 is not needed for biometric acquisition portion 520 when other types of biometric data, such as odor, capacitance, ambient noise, and the like are acquired that do not necessarily require specific measurement activation. Thus, the described biometric acquisition portion 520 is merely exemplary of many possible embodiments.

As previously described, in one embodiment, user input device 500 may be placed in different states according to instructions from computing device 540. In one state, only event data from peripheral input event sensing portion 510 is output to computing device 540 as output data In another state, peripheral input event data and biometric data are both output to computing device 540 as output data.

In one embodiment of the present invention, the biometric data and the event data are reversibly multiplexed or interleaved in time. In another embodiment, the event data is reversibly encoded or encrypted using the biometric data by processing portion 530. For example, in one encoding scheme processor 530 encrypts data by its private key for purposes of authenticating its signals to computing device 540, which has knowledge of its corresponding, decrypting public key, according to the conventions of the public key crypto system. In alternative embodiments of the present invention, other encoding schemes can be used.

In the present embodiment, computing device 540 reverses the encoding or multiplexing scheme and recovers the event data and biometric data for subsequent processing.

Detailed System Operation

Figure 5A:
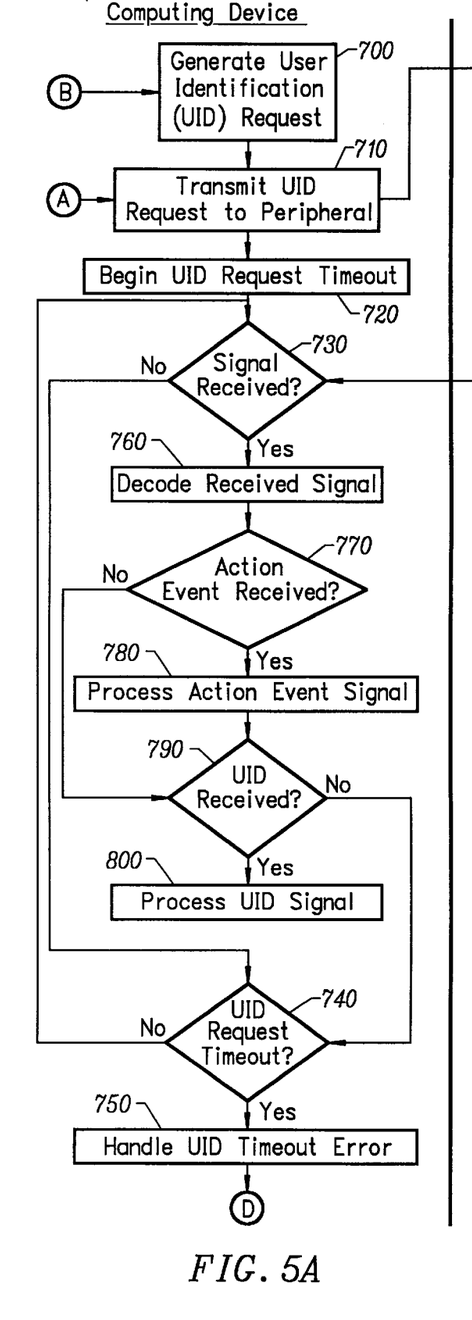
FIGS. 5a and 5b illustrate a flow-chart block diagram of one embodiment of the present invention.
Figure 5B:
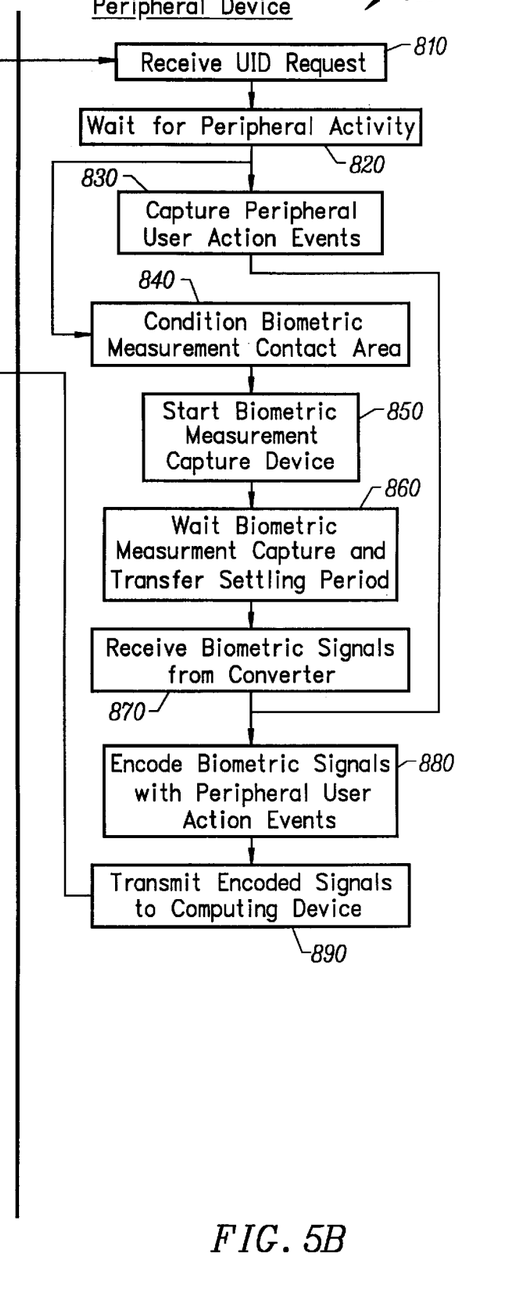

FIGS. 5*a* and 5*b* illustrate a flow-chart block diagram of one embodiment of the present invention. FIGS. 5*a* and 5*b* illustrate actions performed by computing device 540 and user input device 500 described in FIG. 4.

Figure 7:
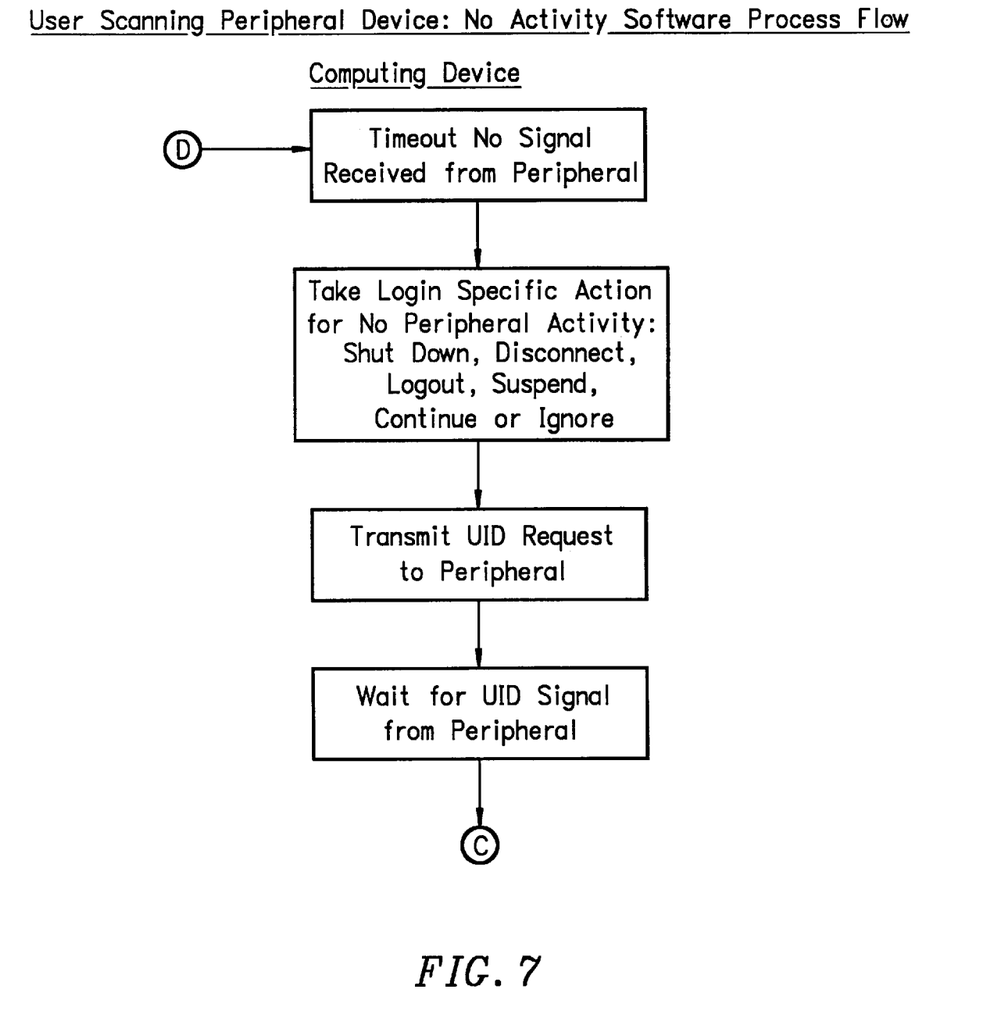
FIG. 7 illustrates a flow-chart block diagram on one embodiment of the present invention.

Initially, computing device 540 generates a user identification request, step 600. In embodiments of the present invention, this request can be triggered by pre-determined or random "in-session" identification requests embedded in the software, and the like. For example, as is illustrated FIG. 7, one event is inactivity of user input device 500 for a predetermined amount of time, e.g. no keyboard input, no cursor movement, or the like; another type of event is submission of electronic forms, e.g. e-mail messages, on-line secure transactions, and the like. As another example, one event is a request for User Identification (UID) from another entity on a network coupled to computing device 540, e.g. a system administrator, a financial institution, an e-commerce transaction participants, and the like.

The UID request is then transmitted to processing portion 530 of user input device 500, step 710. This request may or may not be encoded for security purposes. Typically the request is communicated to user input device 500 through the same mechanism in which output data is communicated from user input device 500.

In alternative embodiments of the present invention, user input device 500 may include alternative mechanisms for receiving the UID request. For example, user input device 500 may include a cellular telephone receiver, a pager receiver, an FM or other receiver, and the like. The UID request is then broadcast to user input device 500 in the appropriate manner, for example, by calling or paging user input device 500. In related embodiments, where the mechanisms are transceivers, biometric data may also be output from user input device 500 using these transceivers. Such embodiments are particularly useful for remote authentication applications.

In still other embodiments of the present invention, steps 700 and 710 need not be performed when user input device 500 is preprogrammed to deliver biometric data to computing device 540 at semi-regular random, or event driven intervals. In such embodiments, the program running on computing device 540 need not request UID data and may simply expect biometric data at regular intervals, or react to the event of biometric data transmission by device 500.

After the UID request has been submitted, a timer mechanism is started, step 720. In one embodiment, the program begins a timeout algorithm to determine if user input device 500 is operating with the proper response level.

Next, the program determines whether there has been any output data from user input device 500, step 730. If not, the timer mechanism is queried to determine whether there is a timeout condition, step 740. For example, it is determined whether a predetermined amount of time has passed where there has not been any input from user input device 500.

When less than a predetermined amount of time has elapsed with no output data from user input device 500, the program returns to step 730. Otherwise, the program determines that an error condition has occurred and executes an error handling routine, step 750, such as performing a system shut-down operation. Other types of actions can include disconnecting from a network server, ignoring user's input, and the like as discussed previously, and shown in FIG. 7. This amount of time is programmable, and may vary from application to application.

If an output (output data) is detected from user input device 500 in step 730, computing device 540 de-multiplexes and/or decodes the output signal into component portions, step 760.

In the present embodiment, if output data is detected, the program analyzes the decoded signal for the presence of a Peripheral Activity Event Signal (event data), such as a keystroke, a cursor control instruction, and the like, step 770. The event data is subsequently passed to an algorithm that executes that instruction, typically within the operating system of computing device 540, step 780.

Next, computing device 540 determines whether a UID signal (biometric data) has been sent by user input device 500, step 790. In the absence of biometric data from user input device 500, the program returns to the time out condition step, step 740.

Figure 6:
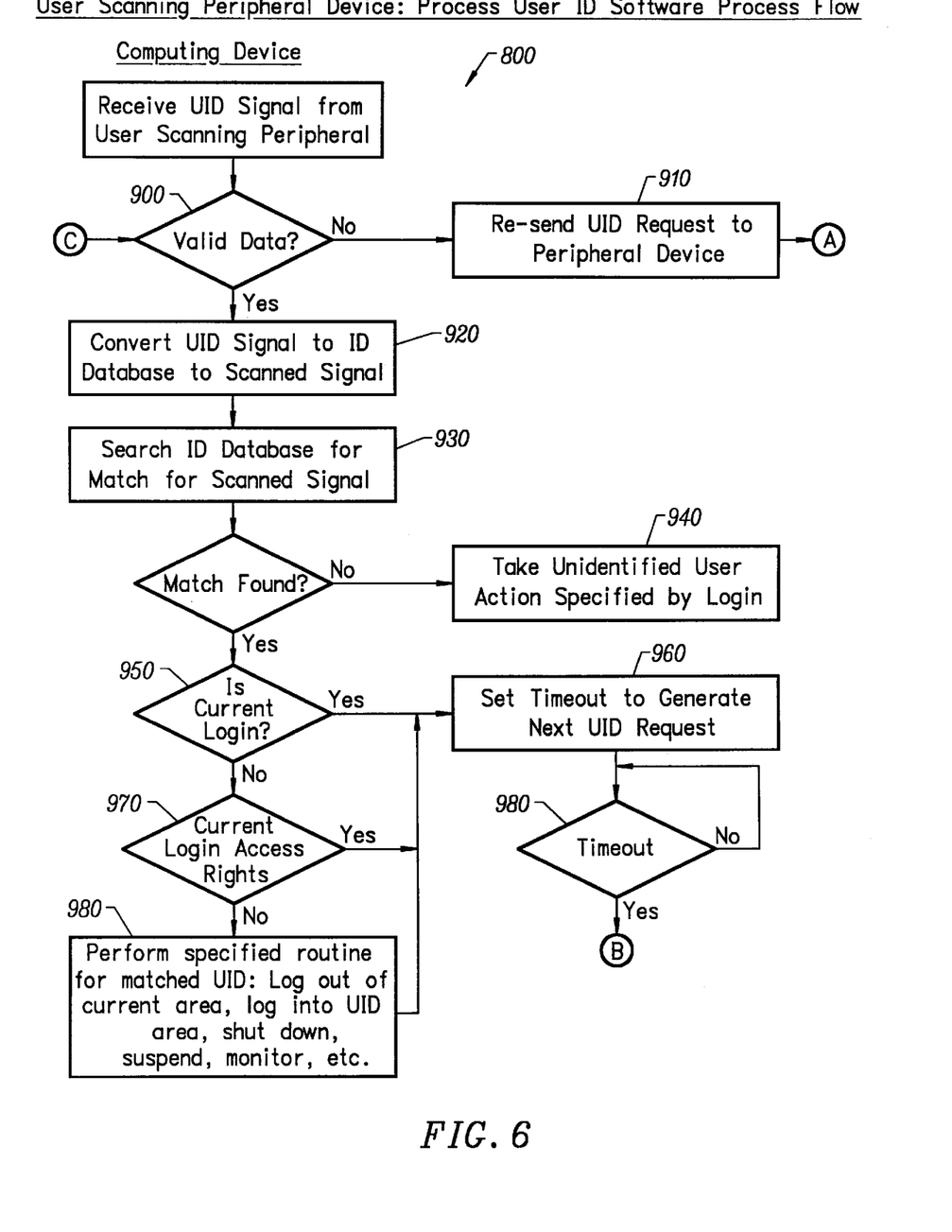
FIG. 6 illustrates a flow-chart block diagram according to another embodiment of the present invention.

Alternatively, when biometric data is detected, the biometric data, such as a representation of a fingerprint, palm-print, voiceprint, moisture reading, odor, and the like is processed, step 800. FIG. 6, described below, describes the processing performed in step 800 in greater detail.

In alternative embodiments of the present invention, steps 790 and 800 are performed before steps 770 and 780. Further, in such an embodiment, event data is not processed until the biometric data has been recorded, until the identity of the user has been established, or the like.

In FIG. 5b, user input device 500 receives the UID request from computing device 540, step 810. As disclosed above, the request may be communicated by the same mechanism used to transmit output data, or may be from an auxiliary mechanism such as a pager mechanism. Further, the UID request may be self-initiated within user input device 500 by an additional timing mechanism.

After receiving the UID request from computing device 540, processing portion 530 then waits for user events, step 820, such as movement of user input device 500, the clicking of a key, the touching of a panel, speech, or the like. In response to the user events, the user events are captured by event sensing portion 510, step 830. Also in response to the user events, processing portion 530 initializes the biometric acquisition portion 520, as described above, step 840. In this particular example, the LEDs illuminate the user contact area.

After the conditioning device 570 is activated, in the present embodiment, the capturing of images of portions of a user's hand is initiated, step 850. The image is considered captured by the CCD array after a predetermined amount of time, typically 20 milliseconds, step 860. In the present embodiment, this delay allows the image of the user hand to be conveyed reliably through the image conduit and to settle upon the CCD light sensing circuitry. Next, the CCD array provides the biometric data to processing portion, step 870.

As can be seen in the flow chart in FIG. 5b, the event data is captured at approximately the same time the biometric data is captured. In other words, during the capture of biometric data, the event sensing portion continues to capture event data for processing portion 530.

In step 880, the biometric data and the event data are combined to form output data. As previously mentioned, the biometric data and event data may be combined in any reversible method, such as multiplexing, interleaving, encoding, encrypting, and the like. The output data is subsequently provided to the computing device 540, step 890.

FIG. 6 illustrates a flow-chart block diagram according to another embodiment of the present invention. FIG. 6 illustrates an embodiment of step 800 in FIG. 5A, processing of a UID signal (biometric data).

Initially, the program analyses the structure of the biometric data to determine if it is in a valid and readable format, step 900. For example, the biometric data may not be complete if the timing between user input device 500 and computing system 540 is off. If the biometric data is not readable, another UID request is generated, step 910, and the program preferably returns to step 710.

When the biometric data is in the correct format, the data may be converted into another form, for example, into a database record format to facilitate cataloging and/or searching, step 920. In embodiments of the present invention, classifying and determining unique data points from scanned fingerprint, thumbprint, or palm print data are familiar to those skilled in the art of biometric measurements.

Next, the user record (database record) may be compared to a database of previously recorded biometric data, step 930. Any conventional comparing method may be used. For example, relation graphs as described in U.S. Pat. No. 5,613,014, characteristic point distances as described in U.S. Pat. No. 4,896,363, or other methods for analyzing a digital data generated from scanning of the hand can be used. The above patents are herein by incorporated by reference for all purposes.

The following steps assume that user input device 500 is coupled to a computing device 540 that is logged into a network using a "current" user login.

If no match is found between the user record and records stored in the database, the software then executes an "Unidentified User" routine specific to the current user login profile, step 940. In embodiments of the present invention, actions taken include shutting down computing device 540, disconnect any open network connection, logging out of the system, locking up of the computing device 540 or user input device 500, creating a log entry of the use of biometric measurements of user input device 500, suspending actions, ignoring user input, sounding an alarm, and the like. In other embodiments of the present invention a standard set of actions may be taken and the actions are not specific for each particular user login profile.

If a match is found, the software then determines if the user corresponds to the current user login, step 950. If the user is identified as the current logged-in user, no interruption in user access is contemplated. At the same time, the program determines a length of time to wait before performing the next "in-session" User Identification procedure, step 980. In alternative embodiments, a set amount of time can be predetermined, for example by a system administrator.

If the user is not identified as the current logged-in user, the program performs the routine specified for this event in the user login profile for the identified user, step 970. For example, automatically logging into particular network resources, providing access to particular directory structures, initiating monitoring programs, automatically configuring e-mail, printer resources, telephone, paging, and the like. Further, if the user has access permission to the current user login, no interruption in user access is contemplated.

In alternative embodiments of the present invention, steps 930–980 need not be performed if record keeping functions is all that is required. For example, if the application is simply determining when any user uses user input device 500, no matching of the user record is required. To enhance such an application, matching of the user record to a database of records, such as in step 930 can be performed. Further, if the user record does not match the database, the user record can be entered into the database.

Other combinations of steps 940–980 can be performed. For example, in an employee time card application, an employee may be asked to type-in her employee identification number onto a transparent keypad. In such an example, the identification number would be the event data, and the fingerprint of the employee is the biometric data. When there is a record match of both the employee number and the employee ID number, the punch-in or punch-out time is noted. However when there is either an employee ID/fingerprint mismatch, no fingerprint match, or no employee ID match, the employee may be re-prompted to enter her employee ID.

The examples in FIGS. 5a, 5b, and 6 are preferably performed one or more times during a "user session". In embodiments of the present invention, the user session may be a period of time a user uses a restricted-access computer, a period of time a user is logged into a network coupled to the computer, a period of time a user uses a specific application program, and the like. In other words, any time the user of the computer needs to be identified, logged, verified, etc., biometric data of the user can be repeatedly captured for such purposes with lessened amount of user-intrusion.

Conclusion

In the foregoing specification, the invention has been described with reference to specific exemplary embodiments thereof. Many changes or modifications are readily envisioned. For example, the presently claimed inventions may also be applied to other areas of technology such as home security systems. In such an example, wherein a numeric touchpad is typically used to enter a password, keys of the numeric touchpad may include sensors that capture a fingerprint of the user and compares the fingerprint and the password to authorized fingerprints and passwords. The passwords may also be different for each user having a fingerprint in the database. In a related application, computer keyboards may also include biometric sensors on certain well used keys such as the "enter" key, the "space" key, and the like . . .

Another embodiment of the present invention may be used where voice commands are given to the computer. In this embodiment, voice commands simultaneously provide the peripheral event data as well as the biometric data. In particular, voice commands may direct the computer to open files, close files, execute different commands, etc., further the voice commands may also be compared to a database of voice samples to determine the identity the user. In some embodiments, certain common keywords can be selected for biometric determination, for example, the punctuation marks "comma", "question mark", "period", and the like; the commands "new line", "open", "close", "exit", "space" and the like; and other user entry, such as "scroll down", "scroll up", "print", etc. In other embodiments, as processing of computer systems increase, a greater number of words, commands, etc. can be used for both event data and biometric data.

The presently claimed inventions may also be applied to ATM or other point of sale systems. Typically, the users of such systems are required to type-in a password to authorize the transaction. One embodiment of the present invention may be embodied as a keypad including a biometric sensors for capturing at least one fingerprint, for example. Before an ATM transaction would be authorized, the password would have to match and the fingerprint would also have to match. Alternatively, the fingerprint is maintained for evidentiary purposes in case the ATM card was used by an unauthorized user.

An extension to the above embodiment would be to use embodiments of the invention with smart card technology. In such an embodiment, each smart card can be programmed to store, in addition to the payment data, biometric data such as the owner's fingerprint. Thus, as the user types-in the password, the fingerprint is captured and compared to the finger print stored on the smart card. To prevent unauthorized use, the authorization for the transaction would not be given if either the password or the fingerprint do not match those stored on the smart card.

Further, the claimed inventions may be applied to situations requiring monitoring of people, for example stockroom access or time sheets. In such embodiments a doorknob may include a biometric sensor that captures a palm print as a user turns the doorknob gaining access to a particular area. The palm print would then be compared to a database of palm prints in order to match the user and time of day data to produce a reviewable log.

In one embodiment of the present invention, a application program such as an on-line financial transaction, or a secure communication program may periodically require capturing and processing of biometric data from the user. The biometric data may be embedded in a response or an authorization by the user, or relayed to another computer on the network for archival, verification, and the like.

In one embodiment, other additional hardware may be included into a user input device. For example, a global positioning system (GPS) receiver, may be included in the user input device. The GPS receiver captures the geographical position of the user input device and this geographical data is transferred to the computing system. In turn the geographical data can be processed locally, forwarded to a remote network location, stored in a database, and the like. By providing geographical data to the computing system, the location of the user can be pinpointed and verified for security reasons. For example, if the user input devices within a military computing environment are all equipped with GPS receivers, the geographic location of any user can be checked. Thus if the user input device is coupled to a military computer and reports a geographic location of North Korea, for example, an alarm is sounded. Other types of additional hardware is also contemplated.

In other embodiments, a percentage of database "hits" can be used to determine the user's identity. In such embodiments, a programmable percentage such as 75%, or 80%, and the like, can be selected as a threshold for identifying the user based upon the biometric data. Because, 100% identification is typically not achievable, because of incomplete biometric capture, fingerprint smudged, speech slurred, etc., and because of current matching algorithms, it is preferred that a threshold number be less than 100%. As security concerns increase, the percentage can also be increased.

The specification and drawings are, accordingly, to be regarded in an illustrative rather than a restrictive sense. It will, however, be evident that other modifications and changes may be made thereunto without departing from the broader spirit and scope of the invention as set forth in the claims.

What is claimed is:

1. A computer peripheral device for providing a computer system with user input data and user biometric data, the computer peripheral device comprising:

an event sensing portion for detecting a user action and for converting the user input into a data first stream, the user action of a type appropriate for the computer peripheral device;

a biometric acquisition portion for acquiring biometric data from the user at substantially a same time the event sensing portion detects the user action, and for converting the biometric data into a second data stream; and a processor coupled to the event sensing portion and the biometric acquisition portion for reversibly encoding together the first data stream and the second data stream to form a third data stream, and for providing the third data stream to the computer system.

2. The computer peripheral device of claim 1 wherein the computer peripheral device is a mouse and the user action is moving the mouse.

3. The computer peripheral device of claim 1 wherein the biometric acquisition portion is a fingerprint acquisition device and the biometric data is an image selected from a group consisting of fingerprints, thumbprints, and palm prints.

4. The computer peripheral device of claim 1 wherein the event sensing portion includes an optical sensor for detecting light signals, and the user action provides streams of light signals to the optical sensor.

5. The computer peripheral device of claim 1 wherein the user action is a physical action, and wherein the event sensing portion comprises:

a physical sensor, for receiving the physical action; and a converter coupled to the physical sensor for converting the physical action into the first data stream.

6. The computer peripheral device of claim 1 wherein the biometric acquisition portion comprises:

a detection mechanism on the computer peripheral device;

a biometric sensor coupled to the detection mechanism for determining a biometric characteristic of the user at the detection mechanism; and a converter coupled to the biometric sensor for converting the biometric characteristic of the user into the second data stream.

7. The computer peripheral device of claim 1 wherein the processor further comprises:

a receiver for receiving a request from the computer system to transmit biometric data and for generating an encode signal;

an encoder coupled to the receiver for encoding the first data stream and the second data stream to form the third data stream in response to the encode signal, and to provide the second data stream as the third data stream otherwise; and a transmitter for transmitting the third data stream to the computer system.

8. A method for providing a computer system with user input data and user biometric data, comprising:

providing a computer peripheral device, the computer peripheral device including an event sensor and a biometric sensor;

in response to a single user action on the user input device, detecting a user induced event with the event sensor; and detecting user biometric data;

converting the user induced event into a first set of electronic signals;

converting the user biometric data into a second set of electronic signals;

combining the first set of electronic signals and the second set of electronic signals to form a third set of electronic signals; and transmitting the third set of electronic signals to the computer system.

9. The method of claim 8 wherein the computer peripheral device of is a keyboard and the user induced event is a keystroke.

10. The method of claim 8 wherein the biometric data is selected from a group consisting of an image of a palm, an image of a face, a recording of a voice.

11. The method of claim 8 wherein the biometric data is a voice print.

12. The method of claim 8 wherein the biometric data is an image of a face.

13. The method of claim 8 further comprising activating the biometric sensor before detecting the user induced event.

14. The method of claim 8 further comprising:

receiving a request from the computer system; and activating the biometric sensor in response to the request.

15. A computer system having an input device for providing input data and biometric data, the input device comprising:

an input portion for detecting the input data in response to a user action, and for converting the input data into first data signals;

a biometric sensing portion for detecting biometric data from the user at substantially a same time the input portion detects the input data, and for converting the biometric data into second data signals; and a processor coupled to the input portion and to the biometric sensing portion for combining the first data signals and the second data signals together to form third data signals, and for providing the third data signals to the computer system.

16. The computer system peripheral device of claim 15 wherein the input device is a mouse and the user action is moving the mouse.

17. The computer system of claim 15 wherein the biometric sensing portion is a fingerprint acquisition device and the biometric data is an image of a fingerprint.

18. The computer system of claim 15 wherein the input portion is selected from a group consisting of an electromechanical sensor, a camera, a microphone.

19. The computer system of claim 17 wherein the biometric sensing portion comprises:

a light emitting source for illuminating the fingerprint;

a charged coupled device for capturing the image of the fingerprint;

an image conduit coupled to the charged coupled device for transmitting the image of the fingerprint to the charged coupled device; and an optical focusing element coupled to the image conduit for focusing light reflected from the fingerprint to provide the image of the fingerprint.

20. The computer system of claim 17 wherein the processor further comprises a receiver unit for detecting an encoding command, wherein the processor is for combining the first data signals and the second data signals to form third data signals, and for providing the third data signals to the computer system in response to the encoding command, and wherein the processor is for providing the first data signals as the third data signals to the computer system otherwise.

21. The method for a computer system to monitor a user with a user input device coupled thereto, during a user session of the computer system, the method comprising:

providing a plurality of user identification requests to the user input device during the user session;

in response to a single user action on the user input device, detecting a user event with the user input device as event data during the user session; and detecting biometric data of the user with the user input device in response the plurality of user identification request during the user session;

encoding the event data with the biometric data with the user input device to form encoded data;

transmitting the encoded data to the computer system during the user session;

decoding the encoded data to recover the event data and the biometric data; and processing the biometric data of the user during the user session.

22. The method of claim 21 wherein the user session is a period of time between the user logging into the computer system and the user logging out of the computer system.

23. The method of claim 21 wherein the user session is a period of time the user runs an application program on the computer system.

24. The method of claim 21 wherein the user session is a period of time from a time the user logs into a network coupled to the computer system and to a time the user logs out of the network.

* * * * *